United States Patent
Tu et al.

(10) Patent No.: US 8,432,853 B2
(45) Date of Patent: Apr. 30, 2013

(54) METHOD, APPARATUS, AND COMPUTER PROGRAM PRODUCT FOR SYSTEM SELECTION DURING SERVICE ACQUISITION

(75) Inventors: Fangqiu Tu, Caldwell, NJ (US); Stanley A. Zadrozny, Westfield, NJ (US)

(73) Assignee: Celico Partnership, Basking Ridge, NJ (US)

( * ) Notice: Subject to any disclaimer, the term of this patent is extended or adjusted under 35 U.S.C. 154(b) by 935 days.

(21) Appl. No.: 11/747,981

(22) Filed: May 14, 2007

(65) Prior Publication Data
US 2008/0285451 A1    Nov. 20, 2008

(51) Int. Cl.
H04W 4/00    (2009.01)

(52) U.S. Cl.
USPC .................. 370/328; 455/434; 455/552.1

(58) Field of Classification Search .................. 370/294, 370/328; 455/450
See application file for complete search history.

(56) References Cited

U.S. PATENT DOCUMENTS

| | | | |
|---|---|---|---|
| 2004/0264393 A1* | 12/2004 | Desgagne et al. ............ | 370/294 |
| 2006/0104228 A1* | 5/2006 | Zhou et al. .................... | 370/328 |
| 2006/0217124 A1* | 9/2006 | Bi et al. ........................ | 455/450 |
| 2007/0270142 A1* | 11/2007 | Willey et al. .................. | 455/434 |

* cited by examiner

*Primary Examiner* — Huy D Vu
*Assistant Examiner* — Joseph Bednash

(57) ABSTRACT

An apparatus for system selection includes a processing element. The processing element may be configured to commence a search for a network service system, determine whether a real-time application is active, and select a network service system in response to a determination that the real-time application is active according to a preference order that is different than an order of preference for network service systems for use if the real-time application is not active.

19 Claims, 5 Drawing Sheets

METHOD, APPARATUS, AND COMPUTER PROGRAM PRODUCT FOR SYSTEM SELECTION DURING SERVICE ACQUISITION

TECHNOLOGICAL FIELD

Embodiments of the present invention relate generally to session related communication, and, more particularly, relate to a method, apparatus, and computer program product for system selection during service acquisition.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to the establishment of communication sessions during which, for example, Internet telephone calls, multimedia distribution, multimedia conferences and the like may be established. Examples of protocols which may be used in such communication sessions may include, for example, Session Initiation Protocol (SIP), Motorola Push-to-Talk (M-PTT) protocol, and the like.

SIP is an application-layer control (signaling) protocol for creating, modifying, and terminating sessions with one or more participants. SIP is widely used as a signaling protocol for Voice over Internet Protocol (VoIP) and media sharing applications. SIP may be used in setting up and tearing down voice or video calls or in any application where session initiation is employed. SIP, therefore, provides a signaling and call setup protocol for IP-based communications that can support a superset of call processing functions and features present in the public switched telephone network (PSTN). Meanwhile, M-PTT protocol is an example of a SIP based protocol which may be employed for session based communications such as push-to-talk (PTT) communications.

In order to enable establishment of, for example, a PTT call, an initiating node in a communication system such as a code division multiple access (CDMA) system may send signaling messages over a radio frequency (RF) channel attempting to establish the PTT call. However, depending upon which CDMA system is available in a particular area, delays of varying lengths may be experienced during call setup and in-call delays, which may negatively impact user satisfaction. In this regard, examples of some of the different serving systems for providing CDMA coverage include 1×RTT (1 times Radio Transmission Technology) and different versions of EVDO (Evolution-Data Optimized) including EVDO Rev0 and EVDO RevA and delays of different lengths may be experienced with each of the above serving systems due to the corresponding different characteristics of each of the serving systems.

SIP based PTT, for example, may currently be provided on a 1×RTT network using the Packet Data Service option. As such, both signaling traffic and media traffic may be carried over forward and reverse fundamental traffic channels. Supplemental traffic channels are typically not used for PTT services. Using dedicated traffic channels assigned to each PTT subscriber during an active PTT call, the 1×RTT network can effectively provide guaranteed qualify of service (QoS) at acceptable levels for real-time sensitive applications such as VoIP, PTT, video telephony, video instant messaging and the like. However, the peak data rate for 1×RTT is typically about 153 Kbps, which may be considered slow by some standards.

EVDO was developed to increase data rates, in particular for data traffic or non-real-time sensitive applications. As such, EVDO Rev0 provides an improved forward link peak rate of about 2.4 Mbps. However, reverse link peak rate for EVDO Rev0 has remained at about 153 Kbps. The asymmetrical allocation of the forward and reverse links contributes to making EVDO Rev0 unsuitable for real-time applications such as PTT or VoIP. Rather, EVDO Rev0 is optimized to support bursty data applications such as FTP and Internet browsing. Accordingly, EVDO Rev0 does not provide guaranteed QoS for real-time applications. Furthermore, EVDO Rev0 only supports a fixed paging slot cycle of 5.12 seconds which also contributes negatively to call setup latency for real-time applications like PTT.

EVDO RevA supports forward link peak rates of about 3.1 Mbps and reverse link rates of up to 1.8 Mbps. The increased reverse link peak rate mitigates the asymmetrical capacity problem associated with EVDO Rev0 to some extent. EVDO RevA is also designed such that a mixture of bursty (e.g., non real-time applications) and real-time applications may be more efficiently supported. With the introduction of Multi-Flow Packet Application and other QoS measures such as RTCMAC (reverse traffic channel media access control) configurations, EVDO RevA can assign higher priorities to latency sensitive data streams and thus provide certain throughput and latency guarantees. An Enhanced Idle State feature and Data Over Signaling protocol available in the EVDO RevA system also provide applications with the flexibility to reduce call setup latencies to an acceptable level for use with real-time applications.

1×RTT is currently widely available and EVDO Rev0 and RevA are becoming more widespread. Accordingly, there are many areas where different combinations of the above mentioned or other systems are available. Current system determination algorithms, which acquire services initially when a mobile terminal is powered up, are configured to prefer EVDO RevA. Such algorithms also generally prefer EVDO Rev0 over 1×RTT. However, for real-time sensitive applications, this preference may not be desirable due to the unsuitability of EVDO Rev0 for real-time sensitive applications.

Accordingly, it may be desirable to provide a mechanism by which to address at least some of the problems described above.

BRIEF SUMMARY

A method, apparatus and computer program product are therefore provided for system selection during service acquisition. In particular, a method, apparatus and computer program product are provided that may enable a device powering up in an area that provides availability for different coverage systems to select an optimal coverage system based on whether a real-time sensitive application is active. Accordingly, for example, if a real-time sensitive application such as a voice application like PTT or VoIP is active, the device may select an order of preference for service coverage that is different than the order of preference for service coverage for use with non real-time sensitive applications.

In one exemplary embodiment, a method for system selection during service acquisition is provided. The method may include commencing a search for a network service system, determining whether a real-time application is active, and, in response to a determination that the real-time application is active, selecting a network service system according to a preference order that is different than an order of preference for network service systems for use if the real-time application is not active.

In another exemplary embodiment, a computer program product for system selection during service acquisition is provided. The computer program product includes at least one computer-readable storage medium having computer-readable program code portions stored therein. The computer-readable program code portions may include first, second and third executable portions. The first executable portion is for commencing a search for a network service system. The second executable portion is for determining whether a real-time application is active. The third executable portion is for, in response to a determination that the real-time application is active, selecting a network service system according to a preference order that is different than an order of preference for network service systems for use if the real-time application is not active.

In another exemplary embodiment, an apparatus for system selection during service acquisition is provided. The apparatus may include a processing element. The processing element may be configured to commence a search for a network service system, determine whether a real-time application is active, and select a network service system in response to a determination that the real-time application is active according to a preference order that is different than an order of preference for network service systems for use if the real-time application is not active.

Embodiments of the invention may provide a method, apparatus and computer program product for system selection during service acquisition. As a result, for example, an optimal network service system may be selected dependent upon the types of services that are active in a network node searching for service. Accordingly, setup latency and in-call delays may be reduced.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
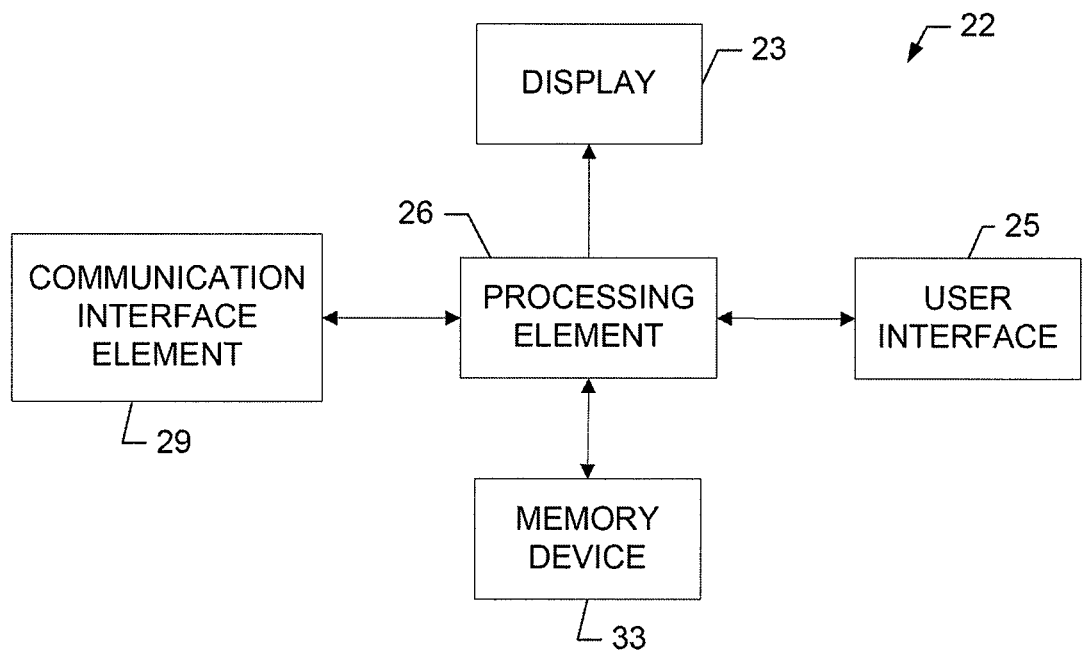
FIG. 1 is a schematic block diagram of a mobile terminal according to an exemplary embodiment of the present invention.

FIG. 1 is a schematic block diagram of a mobile terminal or network component (e.g., a network node) which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 (which may be omitted for certain network components) and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users via a session such as a Session Initiation Protocol (SIP) session, a push-to-talk (PTT) communication session or the like. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
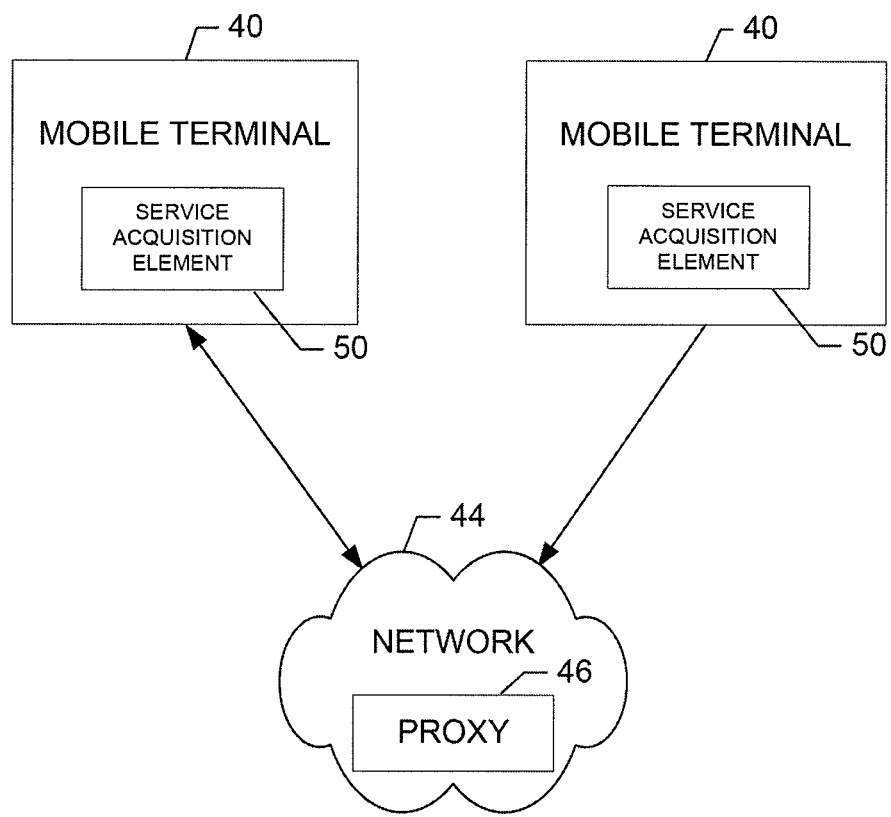
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) and/or M-PTT (e.g., establishing a PTT call) although other communication protocols and communication sessions may also be utilized. As such, FIG. 2 is a simplified schematic diagram illustrating a system capable of supporting communication between network nodes such as mobile terminals 40. For example, SIP, M-PTT or the like, may be utilized to establish communication between the mobile terminals such as via a session which may be provided in connection with SIP, PTT or the like over a network 44. In this regard, it should be noted that the network 44 may include any combination of wireless or wired networks such as, for example, private networks, cellular networks, public networks, etc. The network 44 may include at least one service related server. Although a PTT service will primarily be described below for purposes of example, other types of services could also be utilized in connection with embodiments of the present invention such as, for example, voice over IP, video telephony, video instant messaging and the like.

In an exemplary embodiment in which PTT communications are supported, the server may be a PTT server 46, which may be associated with, for example, the network nodes which have subscribed to a PTT service which may be provided over the network 44. The PTT server 46 may be capable of receiving and forwarding SIP and/or PTT signaling messages and/or messages from another protocol used for session/call setup. In an exemplary embodiment, the PTT server 46 may be a server or other computing device configured to enable communication of messages, such as SIP and/or PTT signaling messages, to and/or from the mobile terminals 40. As such, the PTT server 46 may also include elements similar to those of the mobile terminal 22 described in reference to FIG. 1, except that the PTT server 46 may not include, for example, the display 23.

Although signals may be described hereinafter as passing between the mobile terminals 40, it should be understood that such signals are communicated via the network 44 and also via the PTT server 46 where applicable. It should also be understood that the mobile terminals 40 may be examples of the mobile terminal 22 of FIG. 1, or any other suitable communications device. Service may be provided via the network 44 via various network service systems. Examples of network service systems may include EVDO RevA, EVDO Rev0, and 1×RTT.

In an exemplary embodiment, as shown in FIG. 2, one or more of the mobile terminals 40 may include a service acquisition element 50 configured to enable the corresponding mobile terminal 40 to acquire a network service system based on a predefined priority order. In an exemplary embodiment, the priority order may be different dependent upon whether a real-time application (e.g., such as a PTT application) is being utilized currently. For example, as described generally above, for non-real-time applications, a preference for service acquisition of the service acquisition element 50 may be defined such that the priority order is EVDO RevA, followed by EVDO Rev0, followed by 1×RTT. However, if a real-time application is being currently utilized, the service acquisition element 50 may instead define a priority order to be EVDO RevA, followed by 1×RTT, followed by EVDO Rev0, in contemplation of the asymmetrical allocation of the forward and reverse links in EVDO Rev0.

Accordingly, the service acquisition element 50 may be embodied as any device or means embodied in either hardware, software, or a combination of hardware and software that is configured to select a network service system according to a preference order for use if a real-time application is active that is different than an order of preference for network service systems for use if the real-time application is not active. The preference order may be selected to correspond to particular conditions associated with the context of the mobile terminal. In this regard, context related factors such as whether the mobile terminal is conducting an initial search for service or reacquiring service after a service loss and whether a real-time application is active may be relevant. In an exemplary embodiment, the service acquisition element 50 may be embodied as or operate under the control of a processor such as the processing element 26.

Figure 3:
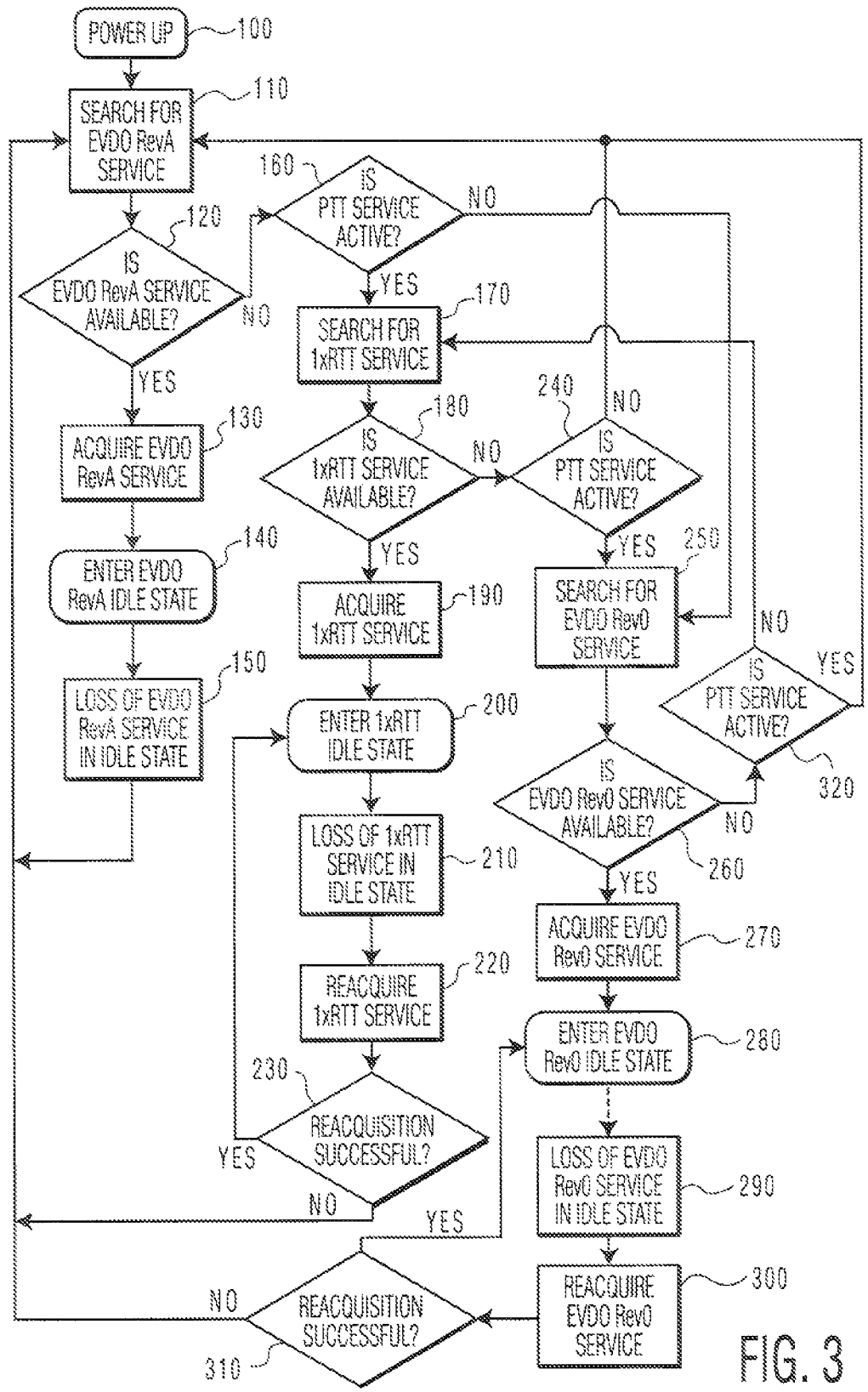
FIG. 3 is a flowchart according to an exemplary method and program product for system selection according to an exemplary embodiment of the present invention.
Figure 4:
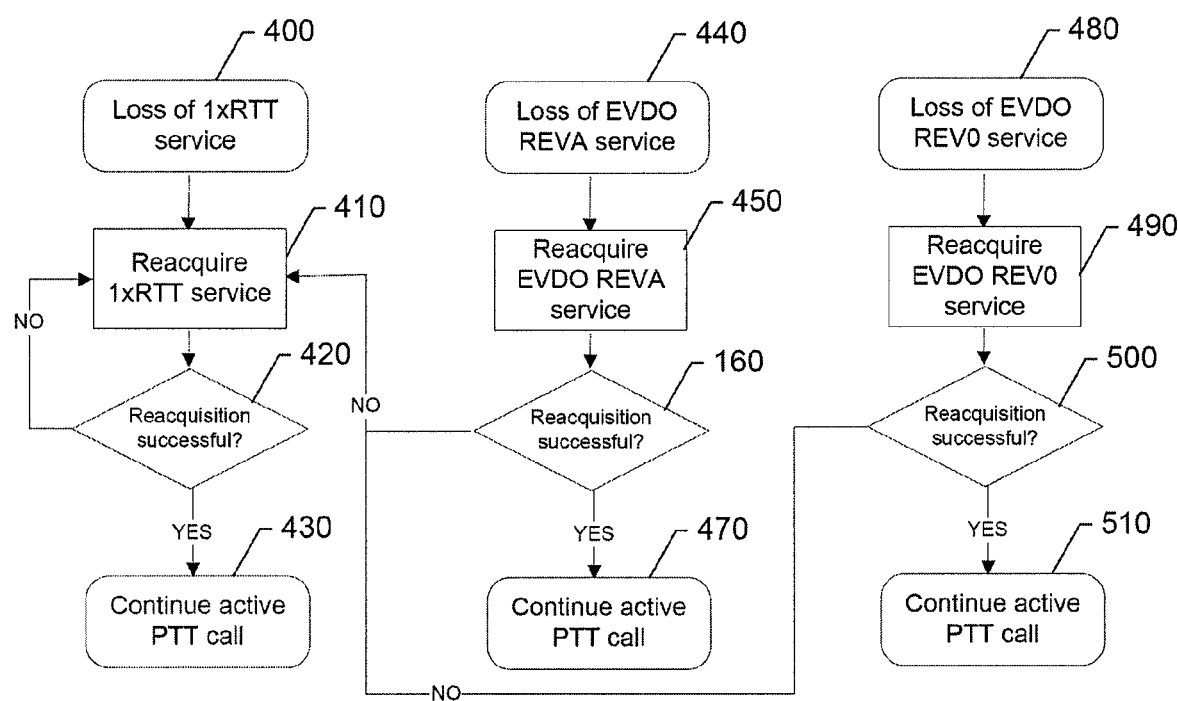
FIG. 4 is a flowchart according to an exemplary method and program product for system selection upon a loss of a current service system according to an exemplary embodiment of the present invention.
Figure 5:
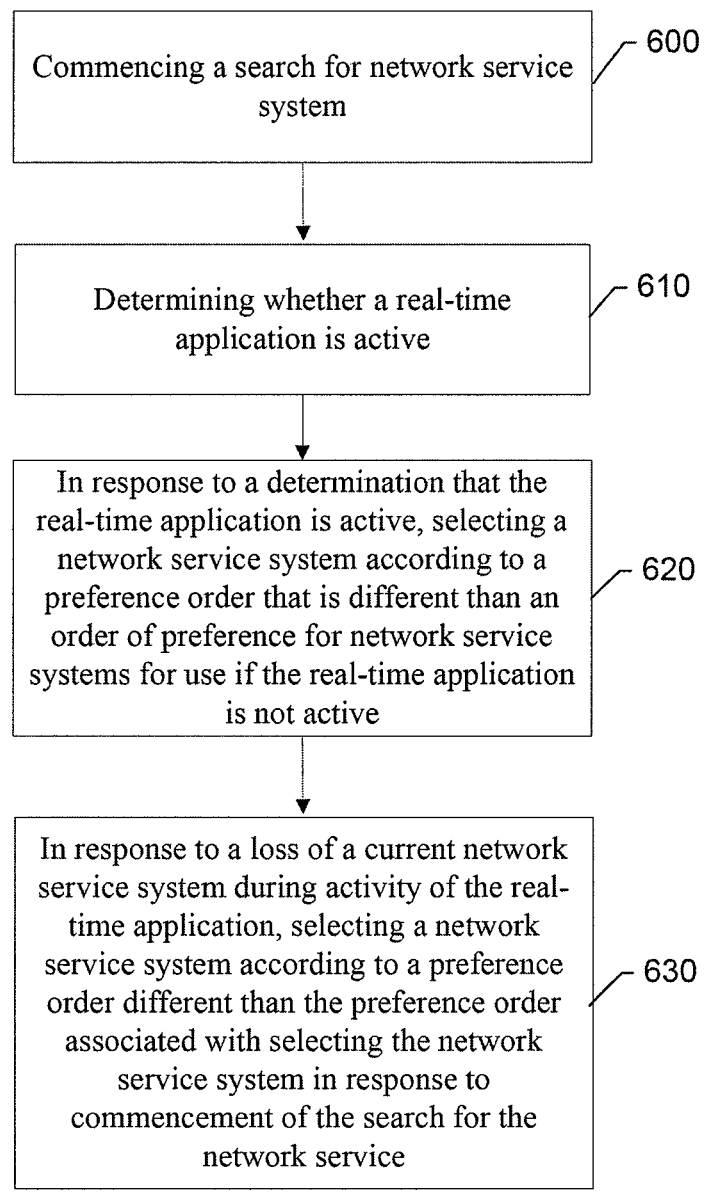
FIG. 5 is a flowchart according to another exemplary method and program product for system selection according to an exemplary embodiment of the present invention.

FIGS. 3-5 are flowcharts according to exemplary methods and program products for system selection according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of system determination, as shown in FIG. 3, may commence after power up of a mobile terminal at operation 100. At operation 110, a search may be commenced for a first service coverage type. In an exemplary embodiment, the first service coverage type may be EVDO RevA. A determination may be made as to the availability of the first service coverage type at operation 120. If the first service coverage type is available, the mobile terminal may acquire the first service coverage type at operation 130. The mobile terminal may then enter the idle state for the corresponding service coverage type at operation 140. In the event of a loss of the first service coverage type in the idle state at operation 150, the mobile terminal may recommence a search for the first service coverage type at operation 110.

If the determination at operation 120 concludes that the first service coverage type is not available, a determination may be made as to whether a real-time application (e.g., such as the PTT service) is active at operation 160. If the real-time application is active, a search may be commenced for a second service coverage type at operation 170. In an exemplary embodiment, the second service coverage type may be 1×RTT. A determination may be made as to the availability of the second service coverage type at operation 180. If the second service coverage type is available, the mobile terminal may acquire the second service coverage type at operation 190. The mobile terminal may then enter the idle state for the corresponding service coverage type at operation 200. In the event of a loss of the second service coverage type in the idle state at operation 210, the mobile terminal may attempt to reacquire the second service coverage type at operation 220. If the attempt is successful as determined at operation 230, the mobile terminal may then enter the idle state for the corresponding service coverage type at operation 200. If the attempt is unsuccessful, the mobile terminal may search for the first service coverage type at operation 110.

If the determination at operation 180 concludes that the second service coverage type is not available, a determination may be made as to whether a real-time application (e.g., such as the PTT service) is active at operation 240. If the real-time application is not active, the mobile terminal may search for the first service coverage type at operation 110. If the real-time application is active, a search may be commenced for a third service coverage type at operation 250. In an exemplary embodiment, the third service coverage type may he EVDO Rev0. A determination may be made as to the availability of the third service coverage type at operation 260. If the third service coverage type is available, the mobile terminal may acquire the third service coverage type at operation 270. The mobile terminal may then enter the idle state for the corresponding service coverage type at operation 280. In the event of a loss of the third service coverage type in the idle state at operation 290, the mobile terminal may attempt to reacquire the third service coverage type at operation 300, if the attempt is successful as determined at operation 310, the mobile terminal may then enter the idle state for the corresponding service coverage type at operation 280. If the attempt is unsuccessful, the mobile terminal may search for the first service coverage type at operation 110.

If the determination at operation 260 concludes that the third service coverage type is not available, a determination may be made as to whether a real-time application (e.g., such as the PTT service) is active at operation 320. If the real-time application is active, a search may be commenced for the first service coverage type at operation 110. If the real-time application is not active, a search may be commenced for the second service coverage type at operation 170.

As may be appreciated, by employing the method illustrated in FIG. 3, the service acquisition element 50 may be configured to select a network service system (e.g., coverage service type) in response to a determination that the real-time application is active according to a preference order that is different than an order of preference for network service systems for use if the real-time application is not active. In this exemplary embodiment, the preference order used if the real-time application is active may be EVDO RevA, followed by 1×RTT, followed by EVDO Rev0. In other words, if a real-time application such as, for example, PTT is active, the service acquisition element 50 may be configured to attempt to select EVDO RevA before attempting to select any other network service system. If EVDO RevA is unavailable, the service acquisition element 50 may be configured to attempt to select 1×RTT. If 1×RTT is also unavailable, the service acquisition element 50 may be configured to attempt to select EVDO Rev0. However, if no real-time application is active, the order of preference for network service system selection may be altered. For example, the order of preference may be EVDO RevA, followed by EVDO Rev0, followed by 1×RTT. Accordingly, for real-time applications, for which the asymmetrical nature of EVDO Rev0 is less desirable, 1×RTT is given preference as an alternative to EVDO RevA. Furthermore, for real-time applications, for which QoS is an important consideration, due to the lack of QoS for EVDO Rev0, 1×RTT has preference over EVDO Rev0 as an alternative to EVDO RevA. Meanwhile, for non-real-time applications for which the asymmetrical nature of EVDO Rev0 is not problematic due to the bursty nature of related transmissions, EVDO Rev0 has preference over 1×RTT as an alternative to EVDO RevA.

FIG. 4 illustrates an alternative example of how a mobile terminal (e.g., specifically the service acquisition element 50 of mobile terminal 40) may attempt to reacquire a serving system (e.g., a service coverage type) in the event of a loss of a current service system. As can be seen from FIG. 4, the illustrated example assumes an active PTT call (e.g., an active real-time application). If the initial serving system is 1×RTT service and such service is lost at operation 400, the mobile terminal may attempt to reacquire the 1×RTT service at operation 410. If a determination is made that the attempt is successful at operation 420, the active PTT call may be continued at operation 430. However, if the attempt is unsuccessful, the mobile terminal may attempt to reacquire the 1×RTT service again at operation 410.

If the initial serving system is an EVDO RevA service and such service is lost at operation 440, the mobile terminal may attempt to reacquire the EVDO RevA service at operation 450. If a determination is made that the attempt is successful at operation 460, the active PTT call may be continued at operation 470. However, if the attempt is unsuccessful, the mobile terminal may attempt to reacquire the 1×RTT service again at operation 410.

If the initial serving system is an EVDO Rev0 service and such service is lost at operation 480, the mobile terminal may attempt to reacquire the EVDO Rev0 service at operation 490. If a determination is made that the attempt is successful at operation 500, the active PTT call may be continued at operation 510. However, if the attempt is unsuccessful, the mobile terminal may attempt to reacquire the 1×RTT service again at operation 410.

As may be appreciated from FIG. 4, if a real-time application is active and a current service system is lost, due to the very wide coverage area associated with 1×RTT and thus reliability associated with the presence of 1×RTT, in this exemplary embodiment, the order of preference for network service system selection may be different from the orders of preference associated with initial network system selection for situations in which a real-time application is active or inactive. In this exemplary embodiment, the order of preference for reacquisition may be the current network service system followed by 1×RTT. Accordingly, in one exemplary embodiment, if a current network service system is lost, the service acquisition element 50 may first attempt to reacquire the current network service system and, if the current network service system cannot be successfully reacquired, the service acquisition element 50 may then attempt to acquire 1×RTT.

Another embodiment of a method of system selection according to an exemplary embodiment of the present invention, as shown in FIG. 5, may include commencing a search for network service system at operation 600. At operation 610 a determination may be made as to whether a real-time application is active. In response to a determination that the real-time application is active, a network service system may be selected according to a preference order that is different than an order of preference for network service systems for use if the real-time application is not active at operation 620. In an exemplary embodiment, the method may further include, in response to a loss of a current network service system during activity of the real-time application, selecting a network service system according to a preference order different than the preference order associated with selecting the network service system in response to commencement of the search for the network service at operation 630. In other words, in an exemplary embodiment, the preference order for selection of a network service system in response to a loss of a current network service system may be different than any preference order associated with initial selection of a network service system.

In an exemplary embodiment, operation 610 may include selecting a first network service system having higher forward link and reverse link peak data rates than a second network service system and a third network service system, selecting the second network service system if the first network service system is unavailable and the real-time application is not active, the second network service system having a higher forward link peak data rate than the third network service system and a reverse link that is substantially equal to the peak data rate of the reverse link of the third network service system, in accordance with the order of preference, and selecting the third network service system if the first network service system is unavailable and the real-time application is active, in accordance with the preference order. In an exemplary embodiment, the first network service system may be EVDO RevA, the second network service system may be EVDO Rev0, and the third network service system may be 1×RTT. In another exemplary embodiment, the method may further include operations of selecting the third network service system if the first and second network service systems are unavailable and the real-time application is not active, or selecting the second network service system if the first and third network service systems are unavailable and the real-time application is active. In yet another exemplary embodiment, selecting a network service system may include selecting one of a plurality of network service systems in which the selected network service system is selected on the basis of having the greatest symmetry between forward and reverse link data rates among available ones of the plurality of network service systems. Alternatively, selecting a network service system may include selecting one of a plurality of network service systems in which the selected network service system is selected on the basis of having the greatest QoS among available ones of the plurality of network service systems.

In various exemplary embodiments, operation 610 may include determining whether a push-to-talk (PTT) service is active, determining whether a voice over internet protocol (VoIP) service is active, determining whether a video telephony service is active, or determining whether a video instant messaging service is active.

Many modifications and other embodiments of the inventions set forth herein will come to mind to one skilled in the art to which these embodiments pertain having the benefit of the teachings presented in the foregoing descriptions and the associated drawings. For example, while embodiments have been described in conjunction with confirmation of registration in conjunction with the exchange of M-PTT messages, other embodiments of the present invention can be employed in conjunction with other services and/or the exchange of other types of messages. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for system selection comprising:
   commencing a search for a network service system;
   determining whether a real-time application is active; and
   selecting and establishing a radio link with one of at least three different network systems by:
   (i) selecting an EVDO RevA network service system if the real-time application is active;
   (ii) selecting an EVDO Rev0 network service system if the EVDO RevA network service system is unavailable and if the real-time application is not active; and
   (iii) selecting an 1×RTT network service system without first selecting the EVDO Rev0 network service system if the EVDO RevA network service system is unavailable and if the real-time application is active.

2. The method of claim 1, further comprising reacquiring and establishing a radio link with a subsequent network service system upon loss of the selected network service system, wherein the reacquiring is based on a pre-established reacquisition preference order, wherein the reacquisition preference order is the selected network service system followed by a previously determined alternate network service system.

3. The method of claim 1, further comprising:
   selecting the 1×RTT network service system if the EVDO RevA and EVDO Rev0 network service systems are unavailable and the real-time application is not active; or
   selecting the EVDO Rev0 network service system if the EVDO RevA and 1×RTT network service systems are unavailable and the real-time application is active.

4. The method of claim 1, wherein determining whether the real-time application is active comprises determining whether a push-to-talk (PTT) service is active.

5. The method of claim 1, wherein determining whether the real-time application is active comprises determining whether:
   a voice over internet protocol (VoIP) service is active;

a video telephony service is active; or a video instant messaging service is active.

6. The method of claim 2, further comprising, selecting and establishing a radio link with a network service system according to the reacquisition preference order, in response to a loss of a current network service system during activity of the real-time application and in response to commencement of the search for the network service.

7. A computer program product for system selection, the computer program product comprising:

at least one non-transitory computer-readable storage medium having computer-readable program code portions stored therein, the computer-readable program code portions comprising:

a first executable portion for commencing a search for a network service system;

a second executable portion for determining whether a real-time application is active; and a third executable portion for selecting and establishing a radio link with one of at least three different network systems by:

(i) selecting an EVDO RevA network service system if the real-time application is active;

(ii) selecting an EVDO Rev0 network service system if the EVDO RevA network service system is unavailable and if the real-time application is not active; and (iii) selecting a 1xRTT network service system without first selecting the EVDO Rev0 network service system if the EVDO RevA network service system is unavailable and if the real-time application is active.

8. The computer program product of claim 7, further comprising a fourth executable portion for reacquiring and establishing a radio link with a subsequent network service system upon loss of the selected network service system, wherein the reacquiring is based on a pre-established reacquisition preference order, wherein the reacquisition preference order is the selected network service system followed by a previously determined alternate network service system.

9. The computer program product of claim 7, further comprising:

a fifth executable portion for selecting the 1xRTT third network service system if the EVDO RevA and EVDO Rev0 network service systems are unavailable and the real-time application is not active; or a sixth executable portion for selecting the EVDO Rev0 network service system if the EVDO RevA and 1xRTT network service systems are unavailable and the real-time application is active.

10. The computer program product of claim 7, wherein the second executable portion includes instructions for determining whether a push-to-talk (PTT) service is active.

11. The computer program product of claim 7, wherein the second executable portion includes instructions for determining whether:

a voice over internet protocol (VoIP) service is active;

a video telephony service is active; or a video instant messaging service is active.

12. The computer program product of claim 8, further comprising a fifth executable portion for selecting and establishing a radio link with a network service system according to the reacquisition preference order, in response to a loss of a current network service system during activity of the real-time application, and in response to commencement of the search for the network service.

13. An apparatus for system selection, the apparatus comprising:

a memory device configured to store instructions;

a processing element configured to receive and execute the instructions to:

commence a search for a network service system;

determine whether a real-time application is active; and select and establish a radio link with one of at least three different network systems by:

(i) selecting an EVDO RevA network service system if the real-time application is active;

(ii) selecting an EVDO Rev0 network service system if the EVDO RevA network service system is unavailable and if the real-time application is not active; and (iii) selecting a 1xRTT network service system without first selecting the EVDO Rev0 network service system if the EVDO RevA network service system is unavailable and if the real-time application is active.

14. The apparatus of claim 13, wherein the processing element further executes instructions to reacquire a subsequent network service system upon loss of the selected network service system, wherein the reacquiring is based on a pre-established reacquisition preference order, wherein the reacquisition preference order is the selected network service system followed by a previously determined alternate network service system.

15. The apparatus of claim 13, wherein the processing element further executes instructions to:

select and establish a radio link with the 1xRTT network service system if the EVDO RevA and EVDO Rev0 network service systems are unavailable and the real-time application is not active; or select and establish a radio link with the EVDO Rev0 network service system if the EVDO RevA and 1xRTT network service systems are unavailable and the real-time application is active.

16. The apparatus of claim 13, wherein the processing element further executes instructions to determine whether a push-to-talk (PTT) service is active.

17. The apparatus of claim 13, wherein the processing element further executes instructions to determine whether: a voice over internet protocol (VoIP) service is active; a video telephony service is active; or a video instant messaging service is active.

18. The apparatus of claim 14, wherein the processing element further executes instructions to select and establish a radio link with a network service system according to the reacquisition order in response to a loss of a current network service system during activity of the real-time application and in response to commencement of the search for the network service.

19. The method of claim 1, wherein commencement of the search for a network service system and selection of the network service system occurs in response to a mobile terminal being powered on rather than being in response to the real-time application being activated at the mobile terminal.

* * * * *